United States Patent
Rollings et al.

(10) Patent No.: US 10,519,783 B2
(45) Date of Patent: Dec. 31, 2019

(54) METHOD FOR MODIFYING A SHROUD AND BLADE

(71) Applicant: General Electric Company, Schenectady, NY (US)

(72) Inventors: Richard Gordon Rollings, Greer, SC (US); Kevin Leon Bruce, Greer, SC (US); William Scott Zemitis, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 478 days.

(21) Appl. No.: 15/387,975

(22) Filed: Dec. 22, 2016

(65) Prior Publication Data

US 2018/0230817 A1 Aug. 16, 2018

(51) Int. Cl.
*F01D 5/22* (2006.01)
*B23P 6/00* (2006.01)
*F01D 5/00* (2006.01)

(52) U.S. Cl.
CPC ............. *F01D 5/225* (2013.01); *B23P 6/002* (2013.01); *F01D 5/005* (2013.01); *F05D 2230/10* (2013.01); *F05D 2230/80* (2013.01); *F05D 2240/11* (2013.01); *F05D 2240/307* (2013.01); *F05D 2250/192* (2013.01)

(58) Field of Classification Search
CPC ........... F01D 5/225; F01D 5/006; B23P 6/002
See application file for complete search history.

(56) References Cited

U.S. PATENT DOCUMENTS

| | | | |
|---|---|---|---|
| 6,685,434 B1 | 2/2004 | Humanchuk et al. | |
| 6,851,931 B1 | 2/2005 | Tomberg | |
| 7,063,509 B2 | 6/2006 | Snook et al. | |
| 7,509,736 B2 | 3/2009 | Boudereau et al. | |
| 7,762,779 B2 | 7/2010 | Zemitis et al. | |
| 7,887,295 B2 * | 2/2011 | Brittingham | F01D 5/141 416/189 |

(Continued)

FOREIGN PATENT DOCUMENTS

| | | |
|---|---|---|
| EP | 1 498 577 A2 | 1/2005 |
| EP | 2 735 705 A2 | 5/2014 |

OTHER PUBLICATIONS

Extended European Search Report and Opinion issued in connection with corresponding EP Application No. 17207975.8 dated May 2, 2018.

*Primary Examiner* — Woody A Lee, Jr.
(74) *Attorney, Agent, or Firm* — Dale Davis; Hoffman Warnick LLC (57) ABSTRACT

A method for modifying an airfoil shroud located at a tip of an airfoil is provided. A locating step locates a reference location in a first end edge. The reference location includes a portion of a fillet. A seal rail extends circumferentially along a radially outer surface of the airfoil shroud. The fillet extends along the radially outer surface and is positioned directly adjacent to the seal rail. A forming step forms a compound relief cut in the fillet without performing a weld process on the airfoil shroud to remove the reference location. The compound relief cut has a first cut having a first radius extending from the seal rail towards the first end edge, and a second cut having a second radius extending from an end of the first cut to the first end edge. Modifying the airfoil shroud is complete following forming the compound relief cut.

17 Claims, 5 Drawing Sheets

(56) References Cited

U.S. PATENT DOCUMENTS

| | | | |
|---|---|---|---|
| 8,057,186 B2 | 11/2011 | Brittingham | |
| 8,807,928 B2* | 8/2014 | Kareff | F01D 5/143 |
| | | | 415/173.6 |
| 2009/0180893 A1 | 7/2009 | Brittingham | |
| 2011/0103956 A1 | 5/2011 | Borufka et al. | |
| 2014/0147283 A1 | 5/2014 | Ward, Jr. et al. | |
| 2014/0147284 A1* | 5/2014 | Ward, Jr. | F01D 5/005 |
| | | | 416/189 |
| 2014/0234110 A1* | 8/2014 | Puram | F01D 5/225 |
| | | | 416/212 A |
| 2018/0202298 A1* | 7/2018 | Zemitis | F01D 5/225 |

* cited by examiner

METHOD FOR MODIFYING A SHROUD AND BLADE

BACKGROUND OF THE INVENTION

The subject matter disclosed herein relates to turbine engines. More particularly, the subject matter relates to modifying of turbine parts.

In a gas turbine, a compressor provides pressurized air to one or more combustors wherein the air is mixed with fuel and burned to generate hot combustion gas. These gases flow downstream to a turbine that extracts energy therefrom to produce a mechanical energy output as well as power to drive the compressor. Over time, turbine parts, such as blades or nozzles, may experience fatigue, due to extreme conditions within the turbine, including high temperatures and pressures caused by flow of hot gas. In particular, certain turbine parts, such as blades located on a turbine rotor, may experience fatigue that requires servicing or replacement.

In cases where defect locations in fatigued areas utilize welding or other heat-based operations, the repair process may further fatigue the local area. Thus, repair of some defect locations occurring due to wear and tear is not feasible. Replacement of these parts can be costly, especially if fatigue in selected areas occurs in several parts, such as blades on a rotor wheel.

BRIEF DESCRIPTION OF THE INVENTION

According to one aspect, a method for modifying an airfoil shroud located at a tip of an airfoil is provided. The airfoil shroud has a first end edge, second end edge, leading edge and a trailing edge. A locating step locates a reference location in the first end edge. The reference location includes a portion of a fillet. A seal rail extends circumferentially along a radially outer surface of the airfoil shroud. The fillet extends along the radially outer surface and is positioned directly adjacent to the seal rail. A forming step forms a compound relief cut in the fillet without performing a weld process on the airfoil shroud to remove the reference location. The compound relief cut has a first cut having a first radius extending from the seal rail towards the first end edge, and a second cut having a second radius extending from an end of the first cut to the first end edge. The second radius is larger than the first radius. Modifying the airfoil shroud is complete following forming the compound relief cut.

According to another aspect, a blade includes an airfoil having an airfoil axis. A shroud is disposed at a tip of the airfoil, and the shroud has a first end edge, a second end edge, a leading edge and a trailing edge. A seal rail extends circumferentially along a radially outer surface of the shroud. A fillet extends along the radially outer surface of the shroud and is positioned directly adjacent to the seal rail. A compound relief cut is formed in the first end edge of the shroud. The compound relief cut has a first cut having a first radius extending away from the seal rail and towards the first end edge, and a second cut having a second radius extending away from an end of the first cut to the first end edge. The second radius is larger than the first radius.

According to yet another aspect, a turbine includes a rotor, and a blade coupled to the rotor. The blade includes an airfoil having an airfoil axis. A shroud is disposed at a tip of the airfoil, and the shroud has a first end edge, a second end edge, a leading edge and a trailing edge. A seal rail extends circumferentially along a radially outer surface of the shroud. A fillet extends along the radially outer surface of the shroud and is positioned directly adjacent to the seal rail. A compound relief cut is formed in the first end edge of the shroud. The compound relief cut has a first cut having a first radius extending away from the seal rail and towards the first end edge, and a second cut having a second radius extending away from an end of the first cut to the first end edge. The second radius is larger than the first radius.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
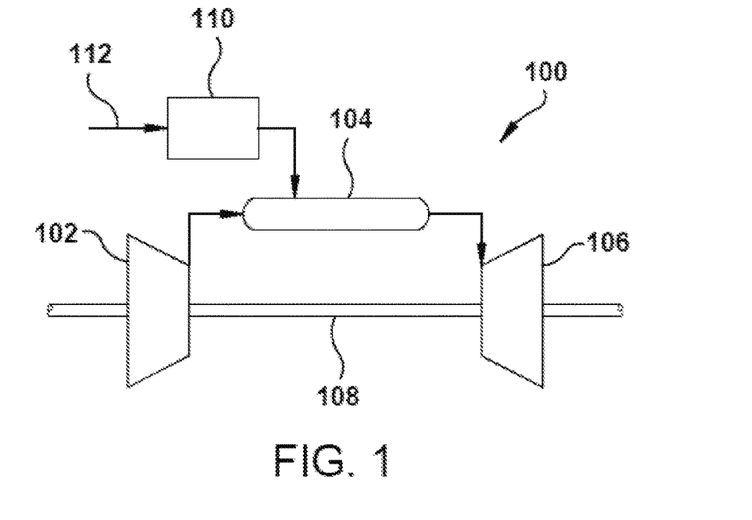
FIG. 1 illustrates a schematic diagram of an embodiment of a gas turbine system.

FIG. 1 is a schematic diagram of an embodiment of a gas turbine system (or turbomachine) 100. The system 100 includes a compressor 102, a combustor 104, a turbine 106, a shaft (or rotor) 108 and a fuel nozzle 110. The system 100 may include a plurality of compressors 102, radially outerustors 104, turbines 106, shafts 108 and fuel nozzles 110. As depicted, the compressor 102 and turbine 106 are coupled by the shaft 108. The shaft 108 may be a single shaft or a plurality of shaft segments coupled together to form shaft 108.

In an aspect, the combustor 104 uses liquid and/or gas fuel, such as natural gas or a hydrogen rich synthetic gas, to run the turbine system. For example, fuel nozzles 110 are in fluid communication with a fuel supply 112 and pressurized air from the compressor 102. The fuel nozzles 110 create an air-fuel mix, and discharge the air-fuel mix into the combustor 104, thereby causing a combustion that creates a hot pressurized exhaust gas. The combustor 104 directs the hot pressurized exhaust gas through a transition piece into a rotor and stator assembly, causing turbine 106 rotation as the gas exits nozzles where the gas is then directed to the turbine blades. The rotation of the blades coupled to the rotor in turbine 106 causes the shaft 108 to rotate, thereby compressing the air as it flows into the compressor 102.

In embodiments, a relief cut is formed in a shroud of a blade (or nozzle) in the turbine. In an embodiment, the shroud is positioned on a turbine blade. The relief cut is formed to modify the shroud and remove a defect or reference location in the airfoil shroud. In an embodiment, the reference location is a flaw or defect, such as a crack, that has been identified on the shroud. The defect or reference location may be caused by fatigue from exposure to extreme heat and pressure during turbine operation. In an embodiment, the relief cut is formed without welding the shroud, thus reducing incidence of additional fatigue that may be introduced to the shroud by a welding process. In one embodiment, the relief cut provides a structurally sound repair to the airfoil shroud to enable reuse and reinstallation of the airfoil following forming of the relief cut. Accordingly, the repair process provides savings in time and costs when servicing the airfoil.

As used herein, "downstream" and "upstream" are terms that indicate a direction relative to the flow of working fluid through the turbine. As such, the term "downstream" refers to a direction that generally corresponds to the direction of the flow of working fluid, and the term "upstream" generally refers to the direction that is opposite to the direction of flow of working fluid. In addition, the terms "leading edge" and "trailing edge" indicate a position of a part relative to the flow of working fluid. Specifically, a leading edge of an airfoil encounters hot gas flow before a trailing edge of the airfoil. The term "radial" refers to movement or position perpendicular to an axis or center line of a reference part or assembly. It may be useful to describe parts that are at differing radial positions with regard to an axis. In this case, if a first component resides closer to the axis than a second component, it may be stated herein that the first component is "radially inward" of the second component. If, on the other hand, the first component resides further from the axis than the second component, it can be stated herein that the first component is "radially outward" or "outboard" of the second component. The term "axial" refers to movement or position parallel to an axis. For example, the longitudinal centerline of shaft 108 defines an axial axis of the turbine system 100. Finally, the term "circumferential" refers to movement or position around an axis. Although the following discussion primarily focuses on gas turbines, the concepts discussed are not limited to gas turbines and may apply to any suitable rotating machinery, including steam turbines. Accordingly, the discussion herein is directed to gas turbine embodiments, but may apply to steam turbines and other turbomachinery.

Figure 2:
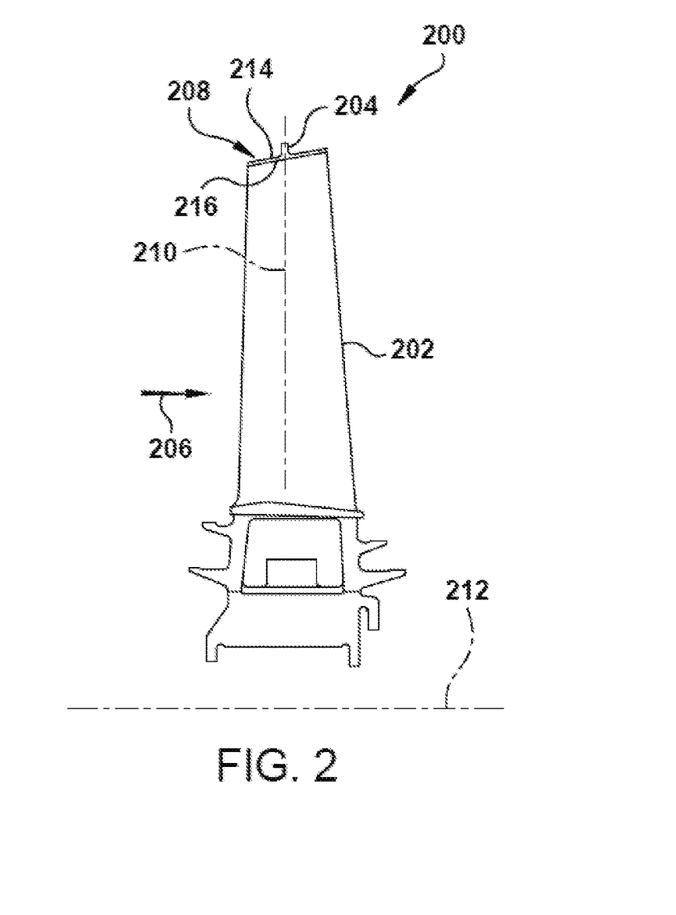
FIG. 2 illustrates a side view of an embodiment of a blade having a shroud.
Figure 3:
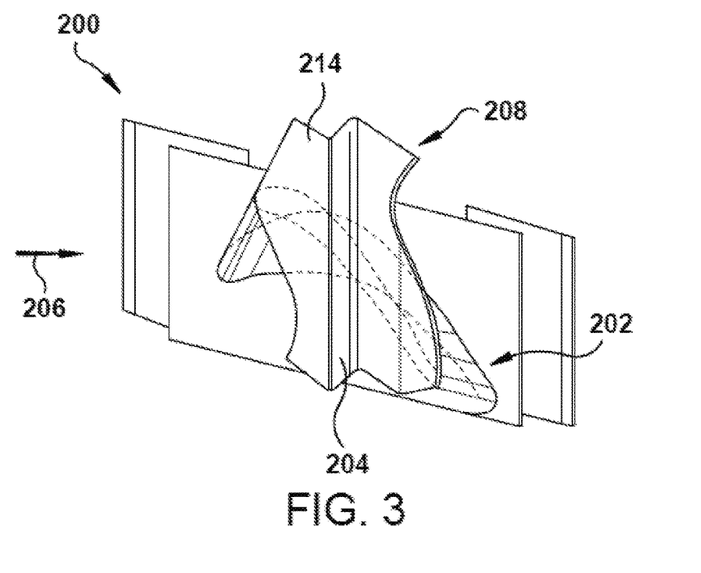
FIG. 3 illustrates a top view of the blade of FIG. 2.

FIG. 2 is a side view of a blade 200. FIG. 3 is a top view of the blade 200 shown in FIG. 3. In embodiments, a plurality of blades 200 are coupled to a rotor wheel in a turbine, such as the turbine engine system 100. The blade 200 includes an airfoil 202. In an embodiment, the airfoil 202 converts the energy of a hot gas flow 206 into tangential motion of the blade, which in turn rotates the rotor to which the blade is attached. At the top of the airfoil 202, a seal rail 204 is provided to prevent the passage of hot gas flow 206 through a gap between the blade tip and the inner surface of the surrounding stationary components (not shown). As depicted, the seal rail 204 extends circumferentially from a surface of a radially outer side (or surface) 214 of a shroud 208 located at the bucket tip. As depicted, the shroud 208 includes the radially outer side 214 and a radially inner side (or surface) 216. In an assembly of blades on a rotor, the seal rail 204 extends circumferentially around a blade row on the rotor, beyond the airfoil 202 sufficiently to line up with seal rails provided at the tip of adjacent blades, effectively blocking flow from bypassing the bucket row so that airflow must be directed to the working length of the blade 202. During operation, the blades and rotor rotate about rotor axis 212. In addition, an airfoil axis 210 extends generally perpendicularly to axis 212 and longitudinally through the airfoil 202.

In embodiments, the shroud 208 is a flat plate supported towards its center by the airfoil 202, where the shroud 208 is subject to high temperatures and centrifugal loads during turbine operation. As a result, portions of the shroud 208 may experience fatigue over time, where embodiments of the modifying process described herein repair fatigue, such as defect, flaw or reference locations in the blade shroud.

Figure 4:
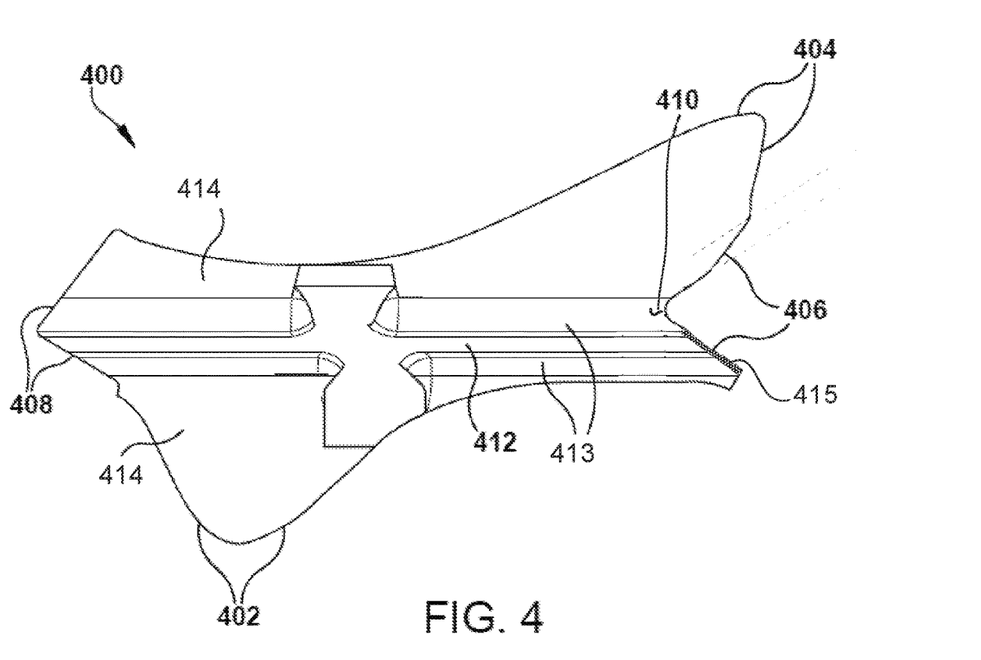
FIG. 4 illustrates a top view of an embodiment of a blade or airfoil shroud having a flaw.

FIG. 4 illustrates a top view of a blade shroud 400 disposed at a tip of an airfoil as described above. The blade (or airfoil) shroud 400 has a leading edge 402, a trailing edge 404, a first end edge 406 and a second end edge 408 defining the shroud. A seal rail 412 extends along a radially outer side 414 of the shroud in a circumferential direction from the first end edge 406 to the second end edge 408. In a blade row assembly for a rotor, the first end edge 406 is configured to be placed adjacent the second end edge 408 of an adjacent shroud to provide a substantially continuous circumferential seal rail assembly in the turbine stage. The circumferential direction is defined as a path generally following the outer diameter of a circle (or tangent to the periphery of the circle), the origin of the circle would be an axial direction (going into and out of the page on which the circle is drawn), and a radial direction would be parallel to the page on which the circle is drawn and beginning at the origin and extending out in a straight line to any point on the circle. The circumferential seal rail assembly blocks hot gas flow (e.g., 206) from bypassing the blade row so that flow is directed along a working length of the blade's airfoil.

The seal rail 412 has fillets 413 on each side extending along the radially outer surface 414 to provide support for the seal rail 412. During operation of the turbine, fatigue caused by high pressures and temperatures can cause formation of a flaw, defect or reference location 410 in the shroud 400. In an embodiment, the reference location 410 is a crack proximate to the fillet 413 of seal rail 412. In cases such as these, where the reference location 410 is in or proximate to a structural region, such as one or more of the fillets 413, or the seal rail 412, a relief cut may be used to repair and remove the reference location 410, as described below. The relief cut may be formed without performing a weld process on the shroud. In contrast, processes using welding to repair reference locations may adversely affect material structural regions of the airfoil shroud 400, such as fillets 413. The shroud 400 may also incorporate a hard face coating (or layer) 415 in selected regions thereof. The hard face coating 415 may be a wear resistant material, such as flame sprayed chrome carbide (or any other suitable material). The hard face 415 is located on surfaces of the shroud that may come in contact with (or rub against) neighboring shroud portions. For example, a neighboring (or second) shroud (not shown) would have a second edge 408 that makes contact with the hard face layer 415 of the first shroud (shown).

Figure 5:
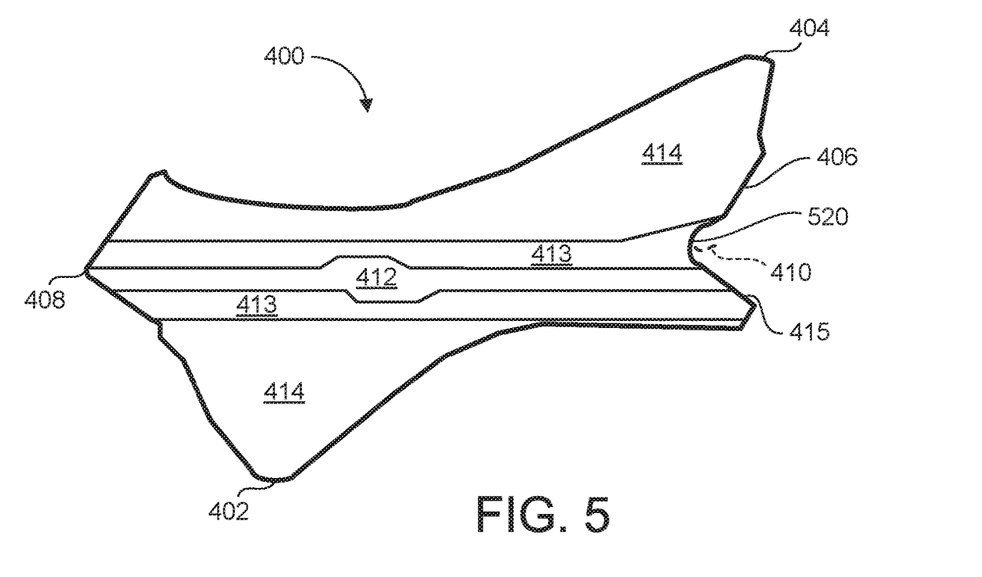
FIG. 5 illustrates a top view of the airfoil shroud shown in FIG. 4 with a relief cut to repair the flaw, according to an aspect of the present invention.

FIG. 5 illustrates a top view of a blade shroud 400 disposed at a tip of an airfoil, according to an aspect of the present invention. The shroud 400 has a compound relief cut 520 formed in the end edge of the shroud. The relief cut 520 may extend through the hard face layer 415 located at the ends of fillet 413 and/or seal rail 412. The compound relief cut has two sections with each having a different radius of curvature, and this configuration reduces stress in the part and increases part operating lifetime.

Figure 6:
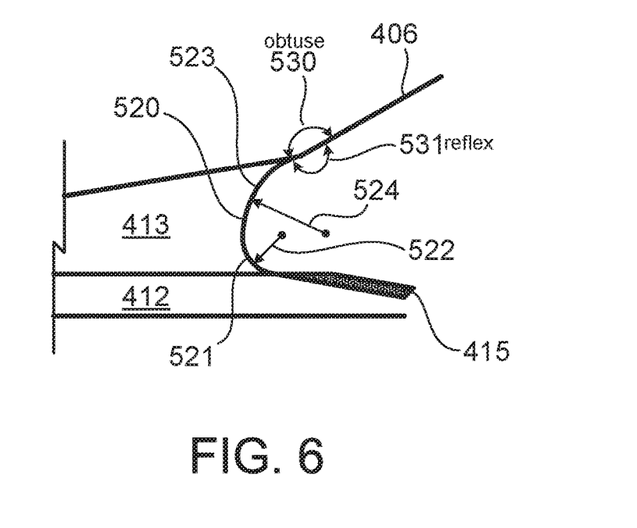
FIG. 6 illustrates an enlarged and top view of the relief cut region shown in FIG. 5, according to an aspect of the present invention.

FIG. 6 illustrates an enlarged view of the relief cut region, as shown in FIG. 5. The hard face layer 415 is located on the end of seal rail 412, and may be present on the end of fillet 413 before the compound relief cut is formed. The compound relief cut 520 is formed in a portion of the first end edge 406, and is comprised of a first cut 521 and a second cut 523, where the first cut is joined smoothly to the second cut. The first cut 521 begins at or in the seal rail 412 and extends away from the seal rail towards a distal end of the first end edge 406. The first cut 521 has a curved profile with a first radius 522. The second cut 523 begins at the end of the first cut 521, and extends away from the first cut to the first end edge 406. The second cut 523 also has a curved profile, but has a second radius 524. The second radius 524 is larger than the first radius 522. As examples only, the first radius 522 may be about 0.100 inches to about 0.125 inches, and the second radius may be about 0.125 inches to about 0.200 inches. The term "about" is defined as giving the stated values a tolerance of 10%. As can be seen, the compound relief cut 520 is formed of two different radius cuts (or curves) being joined smoothly together. The end of the first cut 521 is the beginning of the second cut 523.

Angles are formed between the end of the second cut 523 and the adjacent first end edge portion 406. The exterior angle 531 is the angle formed external to the part, and angle 531 is a reflex angle. A reflex angle is greater than 180 degrees but less than 360 degrees. As one example only, the reflex angle 531 may be about 181 degrees to about 225 degrees, however, any suitable reflex angle may be used as desired in the specific application. An interior angle 530 is also formed between the end of the second cut 523 and the adjacent first end edge portion 406. The interior angle 530 is the angle formed inside the part, and interior angle 530 is an obtuse angle. An obtuse angle is less than 180 degrees but greater than 90 degrees. A summation of angle 530 and angle 531 equals 360 degrees. As one example only, interior angle 530 may be about 135 degrees to about 179 degrees, however, any suitable obtuse angle may be used as desired in the specific application. Further, the compound relief cut 520 may be formed partially into the hard face layer 415.

Figure 7:
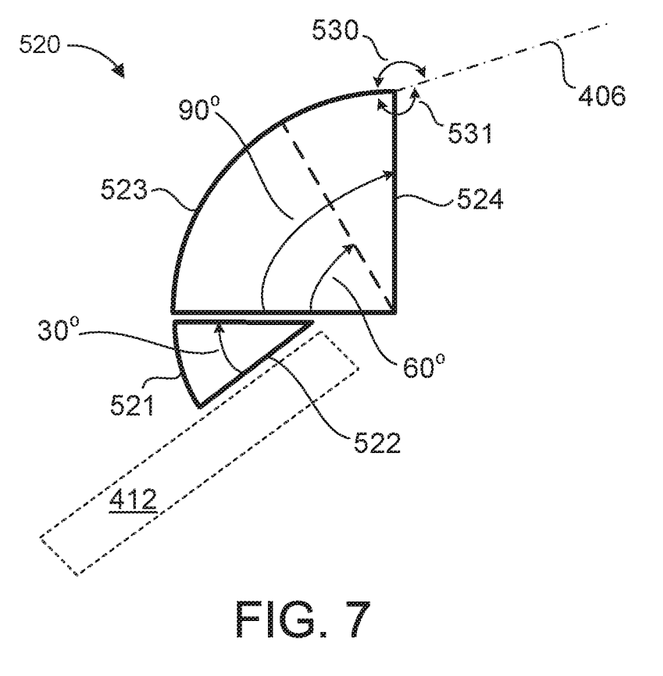
FIG. 7 illustrates a schematic view of the compound relief cut, according to an aspect of the present invention.

FIG. 7 illustrates a schematic view of the compound relief cut 520. The first cut 521 extends for about 30 degrees of arc away from parallel with the seal rail 412. For example, beginning at the seal rail the first cut 521 begins and continues over an arc of about 30 degrees. The second cut 523, which begins at the end of the first cut, extends for an additional about 60 degrees to about 90 degrees of arc away from parallel with the seal rail. The compound relief cut 520 (which includes both the first and second cuts) extends for about 90 degrees to about 120 degrees of arc away from parallel with the seal rail. However, any suitable degree of arc swing could be used for both the first and second cuts.

Figure 8:
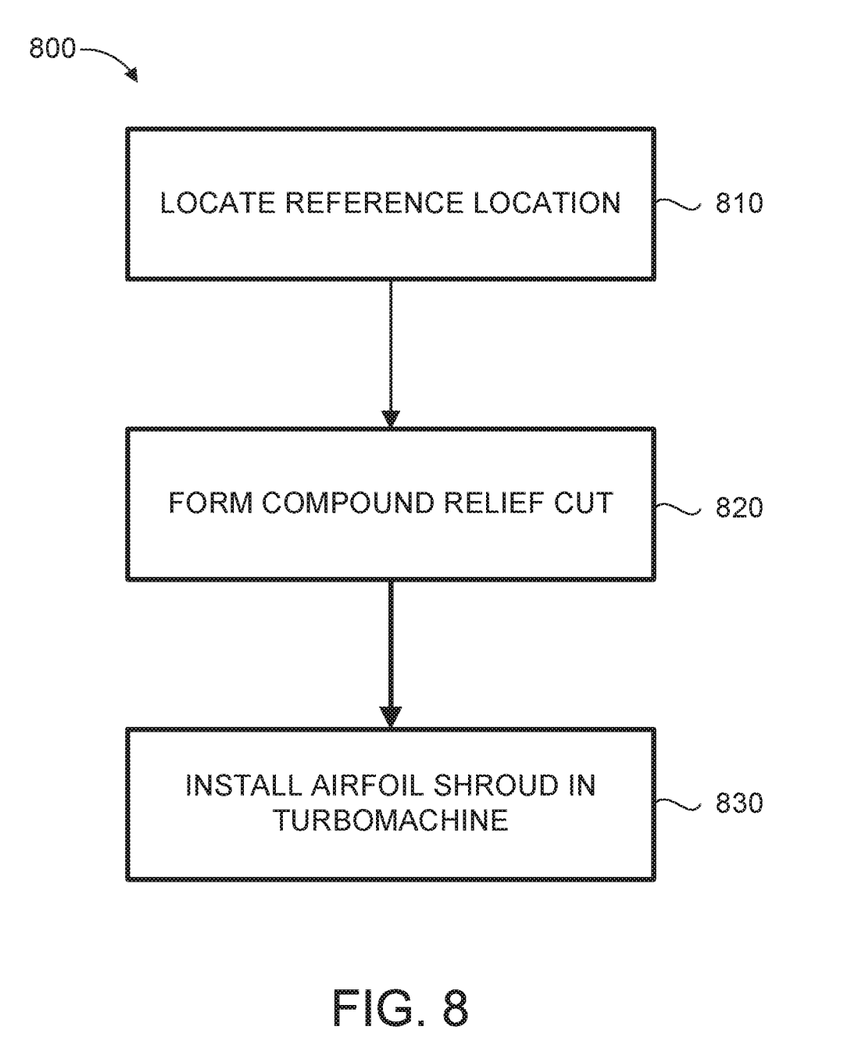
FIG. 8 illustrates a method for modifying an airfoil shroud, according to an aspect of the present invention.

FIG. 8 illustrates a method 800 for modifying an airfoil shroud, according to an aspect of the present invention. The method 800 may include a locating step 810 that locates a reference location 410 in the first end edge 406 of the airfoil shroud. The reference location may include a portion of a fillet 413. The fillet 413 extends along the radially outer surface 414 and is positioned directly adjacent to the seal rail, which extends circumferentially along the radially outer surface 414 of the airfoil shroud.

A forming step 820 forms a compound relief cut 520 in the fillet 413 without performing a weld process on the airfoil shroud to remove the reference location 410. The compound relief cut 520 may be formed with a grinder, drill bit, router or any other suitable abrasive or cutting tool. The compound relief cut 520 has a first cut 521 having a first radius 522 extending from the seal rail 412 towards the first end edge 406, and a second cut 523 having a second radius 524 extending from an end of the first cut 521 to the first end edge 406. The second radius 524 is larger than the first radius 522. In addition, the forming step may include cutting through the hard face layer to form the compound relief cut. Modifying the airfoil shroud is complete following forming the compound relief cut 520, and the airfoil shroud may be installed in a turbomachine following the formation of the relief cut in step 830.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for modifying an airfoil shroud located at a tip of an airfoil, the airfoil shroud having a first end edge, a second end edge, a leading edge and a trailing edge, the method comprising:
   locating a reference location in the first end edge of the airfoil shroud, the reference location including a portion of a fillet, a seal rail extending circumferentially along a radially outer surface of the airfoil shroud, the fillet extending along the radially outer surface and positioned directly adjacent to the seal rail;
   forming a compound relief cut in the fillet without performing a weld process on the airfoil shroud to remove the reference location, the compound relief cut having a first cut having a first radius extending from the seal rail towards the first end edge, and a second cut having a second radius extending from an end of the first cut to the first end edge, the second radius being larger than the first radius, wherein modifying the airfoil shroud is complete following forming the compound relief cut,
   wherein an exterior angle formed between an end of the second cut and the first end edge is a reflex angle.

2. The method of claim 1, further comprising:
   installing the airfoil shroud in a turbomachine following forming the relief cut.

3. The method of claim 1, wherein an interior angle formed between an end of the second cut and the first end edge is an obtuse angle.

4. The method of claim 1, the first radius being about 0.100 inches to about 0.125 inches and the second radius being about 0.125 inches to about 0.200 inches.

5. The method of claim 1, the first cut extending for about 30 degrees of arc away from parallel with the seal rail.

6. The method of claim 5, the second cut beginning at the end of the first cut, and the second cut extending for an additional about 60 degrees to about 90 degrees of arc away from parallel with the seal rail, wherein the compound relief cut extends over an arc away from parallel with the seal rail of about 90 degrees to about 120 degrees.

7. The method of claim 1, further comprising cutting through a hard face layer while forming the compound relief cut.

8. A blade comprising:
an airfoil having an airfoil axis;
a shroud disposed at a tip of the airfoil, the shroud having a first end edge, a second end edge, a leading edge and a trailing edge;
a seal rail extending circumferentially along a radially outer surface of the shroud;
a fillet extending along the radially outer surface of the shroud and positioned directly adjacent to the seal rail; and
a compound relief cut formed in the first end edge of the shroud, the compound relief cut having a first cut having a first radius extending away from the seal rail and towards the first end edge, and a second cut having a second radius extending away from an end of the first cut to the first end edge, the second radius being larger than the first radius,
wherein an exterior angle formed between an end of the second cut and the first end edge is a reflex angle, or an interior angle formed between an end of the second cut and the first end edge is an obtuse angle.

9. The blade of claim 8, the first radius being about 0.100 inches to about 0.125 inches and the second radius being about 0.125 inches to about 0.200 inches.

10. The blade of claim 8, the first cut extending for about 30 degrees of arc away from parallel with the seal rail.

11. The blade of claim 10, the second cut beginning at the end of the first cut, and the second cut extending for an additional about 60 degrees to about 90 degrees of arc away from parallel with the seal rail, wherein the compound relief cut extends over an arc away from parallel with the seal rail of about 90 degrees to about 120 degrees.

12. The blade of claim 11, further comprising a hard face layer on a portion of the first end edge, the compound relief cut formed partially into the hard face layer.

13. A turbine comprising:
a rotor;
a blade coupled to the rotor, the blade comprising:
an airfoil having an airfoil axis;
a shroud disposed at a tip of the airfoil, the shroud having a first end edge, a second end edge, a leading edge and a trailing edge;
a seal rail extending circumferentially along a radially outer surface of the shroud;
a fillet extending along the radially outer surface of the shroud and positioned directly adjacent to the seal rail; and
a compound relief cut formed in the first end edge of the shroud, the compound relief cut having a first cut having a first radius extending away from the seal rail and towards the first end edge, and a second cut having a second radius extending away from an end of the first cut to the first end edge, the second radius being larger than the first radius,
wherein an exterior angle formed between an end of the second cut and the first end edge is a reflex angle, or an interior angle formed between an end of the second cut and the first end edge is an obtuse angle.

14. The turbine of claim 13, the first radius being about 0.100 inches to about 0.125 inches and the second radius being about 0.125 inches to about 0.200 inches.

15. The turbine of claim 13, the first cut extending for about 30 degrees of arc away from parallel with the seal rail.

16. The turbine of claim 15, the second cut beginning at the end of the first cut, and the second cut extending for an additional about 60 degrees to about 90 degrees of arc away from parallel with the seal rail, wherein the compound relief cut extends over an arc away from parallel with the seal rail of about 90 degrees to about 120 degrees.

17. The turbine of claim 16, wherein the blade is located in a third stage of the turbine.

* * * * *